United States Patent
Deng et al.

(10) Patent No.: US 9,661,310 B2
(45) Date of Patent: May 23, 2017

(54) IMAGE DEPTH RECOVERING METHOD AND STEREO IMAGE FETCHING DEVICE THEREOF

(75) Inventors: Hui Deng, Hangzhou (CN); Jin Wang, Hangzhou (CN)

(73) Assignee: ArcSoft Hanzhou Co., Ltd., Hanzhou, Zhejiang Province (CN)

( * ) Notice: Subject to any disclaimer, the term of this patent is extended or adjusted under 35 U.S.C. 154(b) by 785 days.

(21) Appl. No.: 13/304,704

(22) Filed: Nov. 28, 2011

(65) Prior Publication Data
US 2013/0135441 A1 May 30, 2013

(51) Int. Cl.
H04N 13/00 (2006.01)
H04N 13/02 (2006.01)
G06K 9/00 (2006.01)
G06T 7/593 (2017.01)

(52) U.S. Cl.
CPC ......... *H04N 13/0271* (2013.01); *G06T 7/593* (2017.01); *H04N 13/0239* (2013.01); *H04N 13/0242* (2013.01)

(58) Field of Classification Search
CPC ........... H04N 13/0271; H04N 13/0239; H04N 2013/0081; G06T 2207/10021; G06F 1/1616
See application file for complete search history.

(56) References Cited

U.S. PATENT DOCUMENTS

| 5,801,919 | A * | 9/1998 | Griencewic | 361/679.26 |
| 6,674,892 | B1 * | 1/2004 | Melen | G06K 9/03 348/42 |
| 7,599,547 | B2 * | 10/2009 | Sun | G06K 9/32 345/419 |
| 8,284,240 | B2 * | 10/2012 | Saint-Pierre et al. | 348/47 |
| 8,300,085 | B2 * | 10/2012 | Yang | G06K 9/20 348/42 |
| 8,514,291 | B2 * | 8/2013 | Chang | G02B 27/2214 348/211.11 |
| 2005/0168924 | A1 * | 8/2005 | Wu et al. | 361/683 |
| 2007/0140685 | A1 * | 6/2007 | Wu | 396/429 |
| 2010/0142828 | A1 * | 6/2010 | Chang | G06T 7/593 382/209 |
| 2010/0194860 | A1 * | 8/2010 | Mentz | H04M 1/0264 348/47 |
| 2010/0254627 | A1 * | 10/2010 | Panahpour Tehrani et al. | 382/285 |
| 2010/0329556 | A1 * | 12/2010 | Mitarai | G06K 9/6251 382/170 |
| 2011/0142138 | A1 * | 6/2011 | Tian | H04N 13/0022 375/240.24 |
| 2011/0193944 | A1 * | 8/2011 | Lian et al. | 348/47 |
| 2011/0207074 | A1 * | 8/2011 | Hall-Holt et al. | 433/29 |
| 2011/0222757 | A1 * | 9/2011 | Yeatman, Jr. | G06T 7/0075 382/154 |
| 2011/0267264 | A1 * | 11/2011 | McCarthy | G06F 3/017 345/157 |
| 2011/0285701 | A1 * | 11/2011 | Chen | G06K 9/4638 345/419 |

(Continued)

*Primary Examiner* — Joseph Ustaris
*Assistant Examiner* — Rebecca Volentine
(74) *Attorney, Agent, or Firm* — Winston Hsu; Scott Margo (57) ABSTRACT

By utilizing at least one pair of cameras having a user-configurable displacement, it will be more precise to determine a depth map of a resulting 3D image and smoothening the 3D image, without the expense of using expensive depth cameras.

10 Claims, 11 Drawing Sheets

(56) References Cited

U.S. PATENT DOCUMENTS

| | | | |
|---|---|---|---|
| 2012/0014456 A1* | 1/2012 | Martinez Bauza et al. | 375/240.25 |
| 2012/0051624 A1* | 3/2012 | Ando | 382/154 |
| 2012/0086803 A1* | 4/2012 | Malzbender | G01B 11/026 348/140 |
| 2012/0113232 A1* | 5/2012 | Joblove | 348/48 |
| 2012/0127275 A1* | 5/2012 | Von Zitzewitz | G06T 7/593 348/46 |
| 2012/0274626 A1* | 11/2012 | Hsieh | 345/419 |
| 2012/0290257 A1* | 11/2012 | Hodge | G06F 1/3206 702/151 |
| 2012/0293489 A1* | 11/2012 | Chen et al. | 345/419 |
| 2012/0293624 A1* | 11/2012 | Chen et al. | 348/46 |
| 2013/0258067 A1* | 10/2013 | Zhang | H04N 13/0242 348/48 |

* cited by examiner

IMAGE DEPTH RECOVERING METHOD AND STEREO IMAGE FETCHING DEVICE THEREOF

BACKGROUND OF THE INVENTION

1. Field of the Invention

The present invention discloses an image depth recovering method and a stereo image fetching device thereof, and more particularly, to an image depth recovering method and a stereo image fetching device by utilizing a plurality of conventional cameras instead of using depth cameras.

2. Description of the Prior Art

A camera is conventionally utilized for transforming an object existed in the 3D real world into the 2D image plane, by fetching a 2D image of the object; however, image depths of the object are not carried by the 2D image.

For carrying the image depths of the object so as to generate a 3D image, a depth camera may be utilized for carrying the image depths of the object. However, using a depth camera may introduce some disadvantages including: (1) High expense of a depth camera. Not only the manufacturing procedure of the depth camera is way complicated, but the usage of the depth camera is also limited under a lot of conditions, such as environmental conditions; (2) Limited perception range. The perception range of a conventional depth camera is ranged from 1.5 meters to 3 meters. It indicates that it will not be easy to model someone's face or fetch a full-size picture of him or her while attempting taking a picture of him or her; and (3) Large-scale size of a depth camera. A conventional camera is large in its size so that it can only be utilized in an embedded manner or as a peripheral device.

SUMMARY OF THE INVENTION

The present invention discloses a stereo image fetching device. The stereo image fetching device comprises a housing, a first camera, a second camera, and a depth matching module. The first camera is attached to a side of the housing and is configured to generate a first 2D image. The second camera is attached to the side of the housing and is configured to generate a second 2D image. The displacement between the first camera and the second camera is user configurable. The depth matching module is configured to generate a refined 3D image according to the first 2D image and the second 2D image.

The present invention discloses an image depth recovering method. The image depth recovering method comprises disposing a first camera and a second camera to a side of a housing of a stereo image fetching device; determining a user configurable displacement between the first camera and the second camera; generating a first 2D image using the first camera and generating a second 2D image using the second camera with the determined displacement; and generating a refined 3D image according to the first 2D image and the second 2D image.

These and other objectives of the present invention will no doubt become obvious to those of ordinary skill in the art after reading the following detailed description of the preferred embodiment that is illustrated in the various figures and drawings.

DETAILED DESCRIPTION

For neutralizing the disadvantages while using a depth camera for generate a 3D image, the present invention discloses a stereo image fetching device and an image depth recovering method applied on the stereo image fetching device. The disclosed stereo image fetching device includes multiple standard cameras, such as conventional web cameras which have much lower prices than depth cameras, for fetching 2D images related to at least one same object, and is configured to performing the disclosed image depth recovering method for fetching 3D images having image depths. Note that conventional cameras are utilized in the present invention, instead of depth cameras.

In a first part of a whole procedure disclosed by the present invention, for retrieving depths of 2D images filming an object, the disposition of cameras on a corresponding stereo image fetching device is required to be appropriately scheduled, so to retrieve 2D images for forming image depth maps. In a second part of the whole procedure disclosed by the present invention, the image depth maps will be processed by procedures including a depth map generating procedure, a pre-processing procedure, a rectification procedure, an initial cost computation procedure, a global match procedure, and a post-processing procedure. After completing the post-processing procedure, a 3D image carrying depth information of the object and its background will be generated, without the heavy cost and disadvantages caused by using a depth camera.

The first part will be introduced first in the following diagrams illustrating a stereo image fetching device 100 according to a plurality of embodiments of the present invention.

Figure 1:
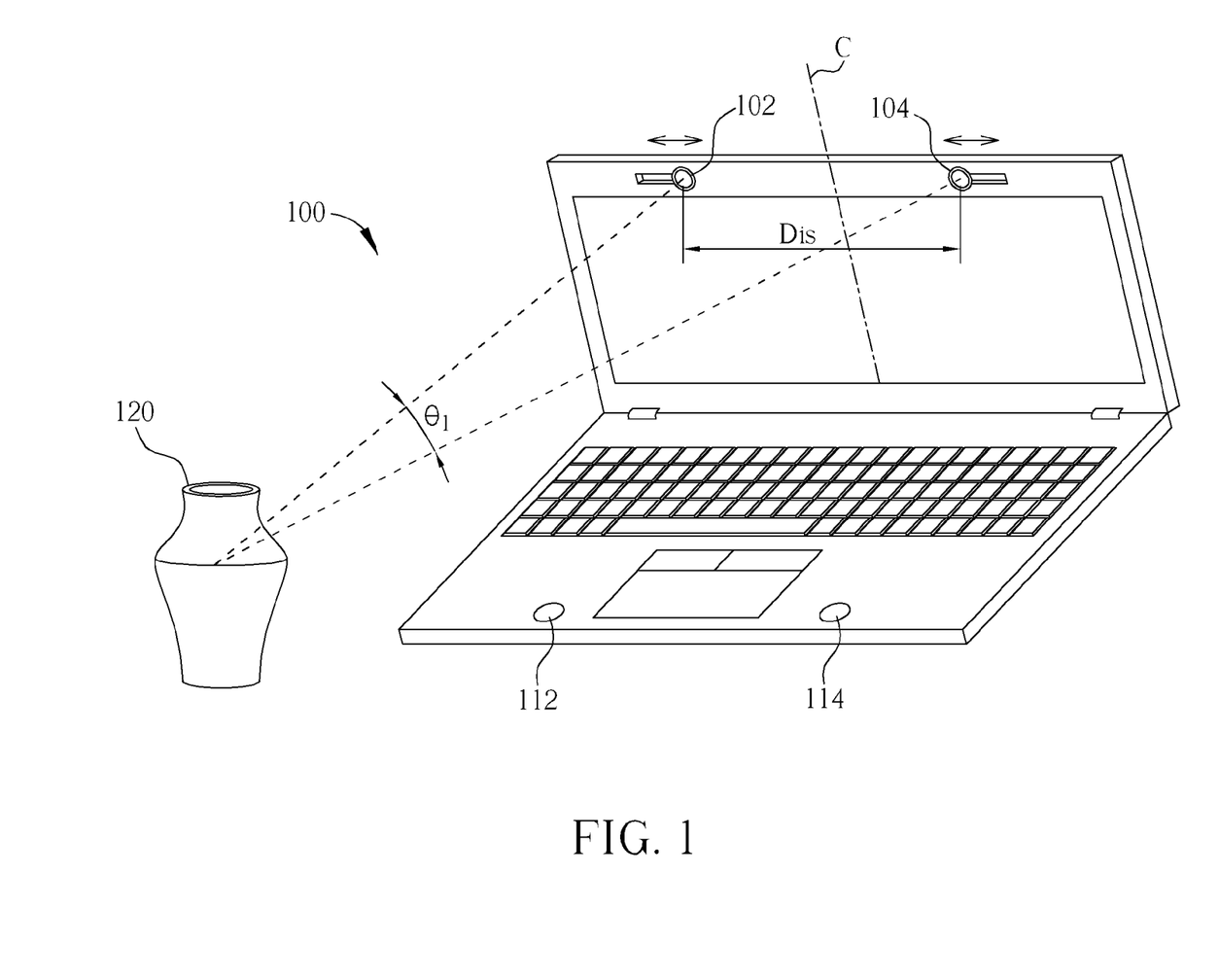
FIG. 1 illustrates disposition of two cameras in a stereo image fetching device according to one embodiment of the present invention.

Please refer to FIG. 1, which illustrates disposition of a pair of cameras 102 and 104 in the stereo image fetching device 100 according to one embodiment of the present invention. As can be observed in FIG. 1, both the cameras 102 and 104 are disposed on a housing 110 of the stereo image fetching device 100 so that both the cameras 102 and 104 are disposed symmetrically to a line of symmetry C between the first camera 102 and the second camera 104.

Both the cameras 102 and 104 are displaced by a user-configurable displacement Dis, which indicates a baseline stretched by an included angle $θ_1$ formed by the object 120 and the cameras 102 and 104, as shown in FIG. 1. Note that a visual angle, a focus length, and a relative location of either one of the cameras 102 and 104 are adjustable, so that the included angle $θ_1$ and the displacement Dis are adjustable either. By adjusting the included angle $θ_1$ and the displacement Dis, better visual effects, such as image resolution, can be retrieved on a first 2D image fetched by the camera 102 and a second 2D image fetched by the camera 104. by configuring the displacement Dis, the image depths of the first and second 2D images can be determined as aids to a last generated 3D image which will be introduced later.

Note that there are two more convex or concave elements 112 and 114 for matching or holding the cameras 102 and 104 while the housing 110 is closed, according to at least one embodiment of the present invention, where the element 112 is disposed corresponding to the camera 102, and the element 114 is disposed corresponding to the camera 104. For example, when the camera 102 is disposed in a concave manner, the element 112 will be disposed in a convex manner for matching the camera 102 when the housing 110 is closed; or, when the camera 102 is disposed in a convex manner, the element 112 will be disposed in a concave manner for holding the camera 102. Besides, a speaker or a microphone may further be disposed in the elements 112 or 114 as aids to the stereo image fetching device 100.

Figure 2:
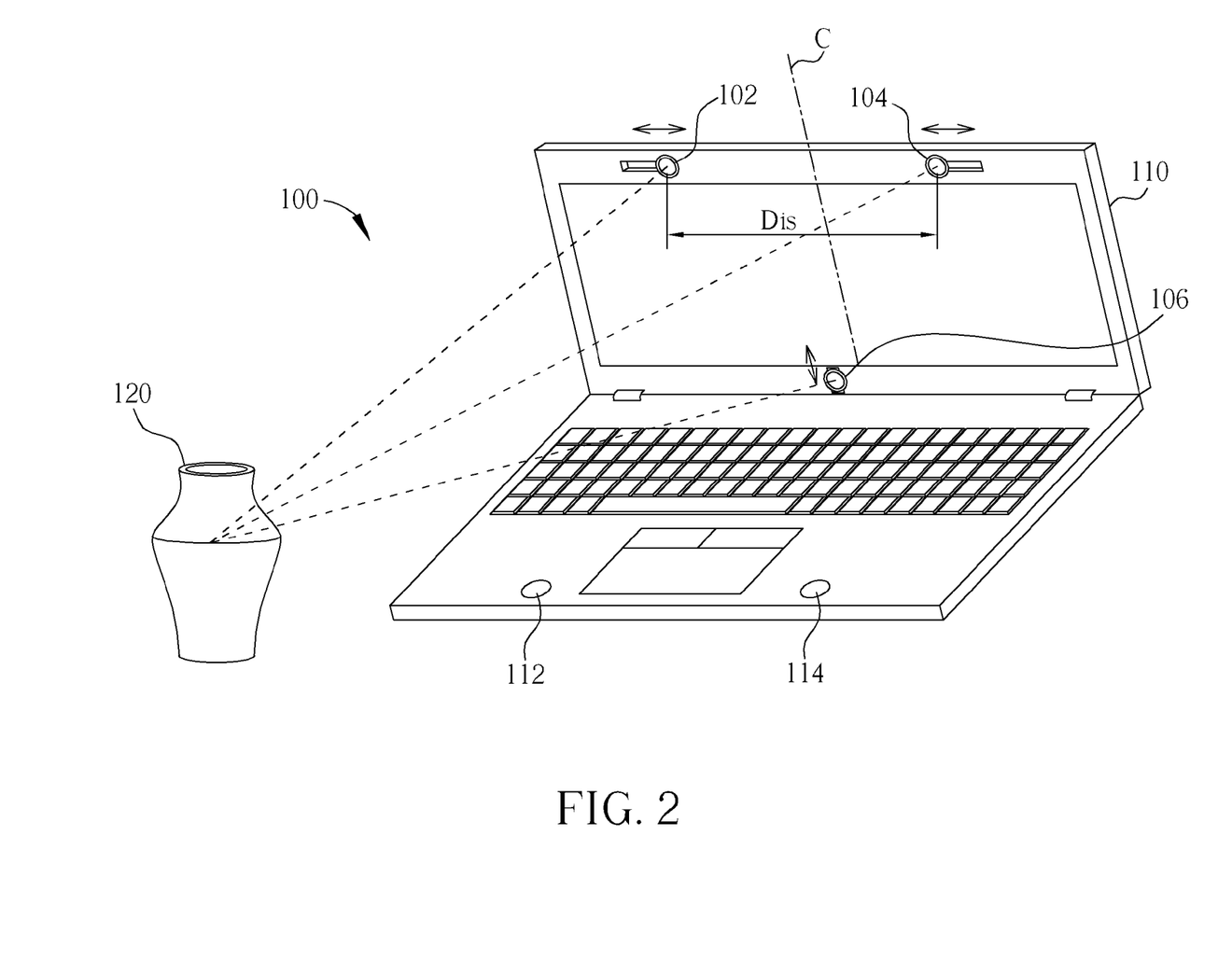
FIG. 2 illustrates disposition of three cameras in a stereo image fetching device according to one embodiment of the present invention.

Please refer to FIG. 2, which illustrates disposition of three cameras 102, 104, and 106 in the stereo image fetching device 100 according to one embodiment of the present invention. As can be observed in FIG. 2, the camera 106 is additionally disposed at the line of symmetry C and is utilized for reducing an overlap and shelter defect that may happen on a final 3D image since the camera 106 introduces better resolution for the final 3D image than merely using both the cameras 102 and 104. As can be inducted, if more cameras are utilized, the overlap and shelter defect will be significantly reduced in the final 3D image since more depth information is retrieved by using more cameras, under the advantage that the cameras utilized in the present invention are much cheaper than depth cameras.

Similarly, there is also an element 116 disposed corresponding to the camera 106 for matching or holding the camera 106 when the housing 110 is closed.

Figure 3:
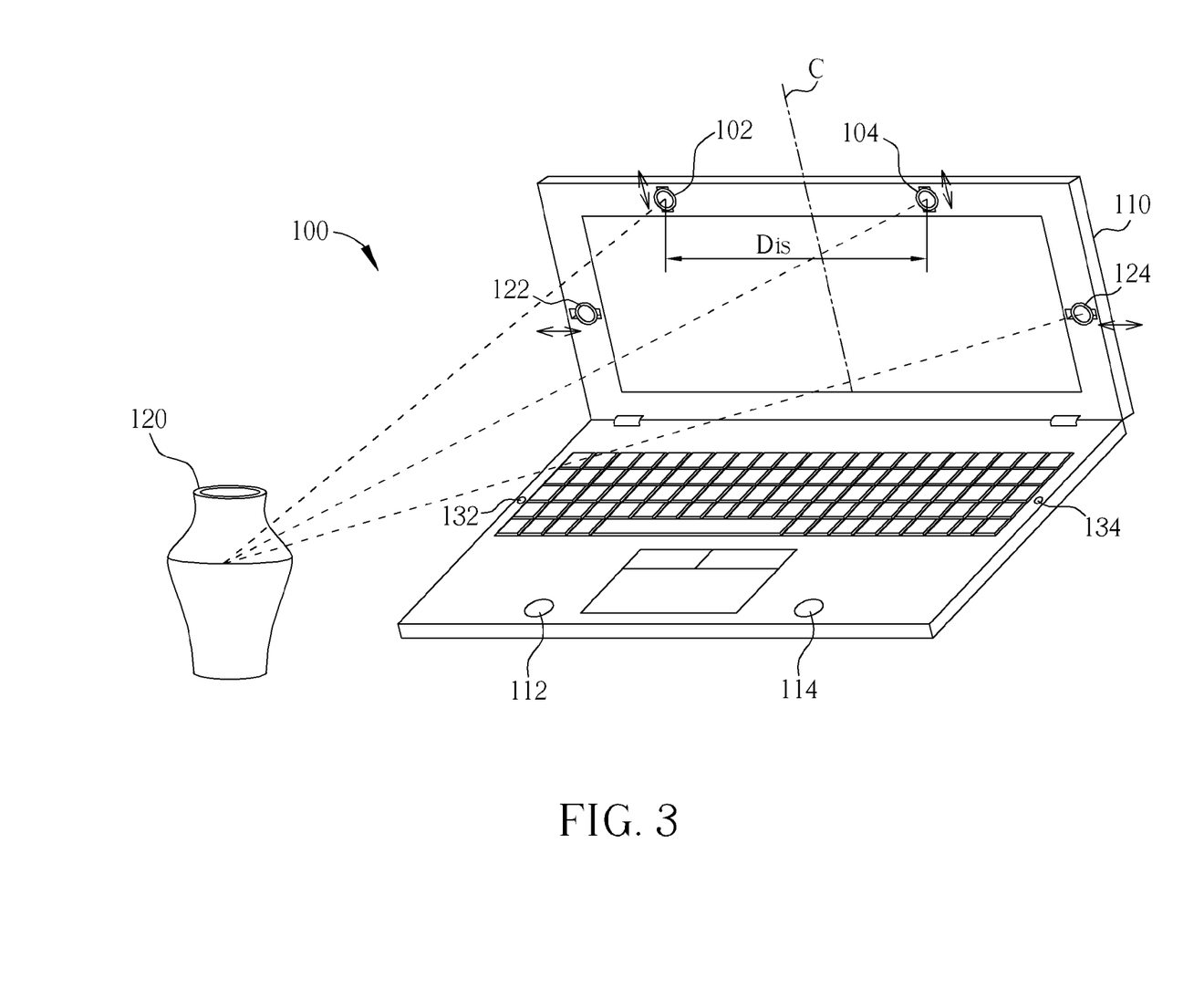
FIG. 3 illustrates disposition of four cameras in a stereo image fetching device according to one embodiment of the present invention.

Please refer to FIG. 3, which illustrates disposition of four cameras 102, 104, 122, and 124 in the stereo image fetching device 100 according to one embodiment of the present invention. As can be observed in FIG. 3, cameras 122 and 124 are also disposed symmetrically to the line of symmetry C. In embodiments of the present invention, the location of the line of symmetry C is determined according to its corresponding pair of cameras, i.e. cameras 102 and 104 or cameras 122 and 124, where the line of symmetry C is shared by the pair of cameras 102 and 104 and the pair of cameras 122 and 124. With the aid of both the cameras 122 and 124, the stereo image fetching device 100 is capable of fetching a larger range of 2D images which result in a larger range of the final 3D image than in FIG. 2; moreover, better resolution can also be retrieved than in FIG. 2 as well, since the depth precision is raised with the usage of more cameras, and since an occlusion problem which may originally occur on the surface of the object 120 in the final 3D image is relieved by the usage of more cameras as well.

Note that movement of relative locations of cameras on the housing should meet the basic condition that two corresponding cameras, such as the pair of cameras 102 and 104 or the cameras 122 and 124, have to be moved in a symmetric manner to the line of symmetry C; or the depth information in the 2D images fetched by non-symmetrically-disposed will fail. The disposition of the cameras should meet the above-mentioned basic condition as well, so that embodiments formed by relocating cameras on the housing of the stereo image fetching device 100 according to the abovementioned basic condition should also be regarded as embodiments of the present invention.

Also note that a number of used cameras is not limited to what shown in FIGS. 1-3 as well, i.e. embodiments formed by changing the number of used cameras in FIGS. 1-3 and meeting the above-mentioned basic condition should also be regarded as embodiment of the present invention as well.

The first part of the whole procedure disclosed in the present invention is briefed as mentioned above. Please refer to FIG. 4, which illustrates a rough flowchart indicating the second part of the whole procedure disclosed in the present invention for generating a 3D image carrying depth information by processing 2D images fetched by the stereo image fetching device 100 disclosed in the present invention.

Figure 4:
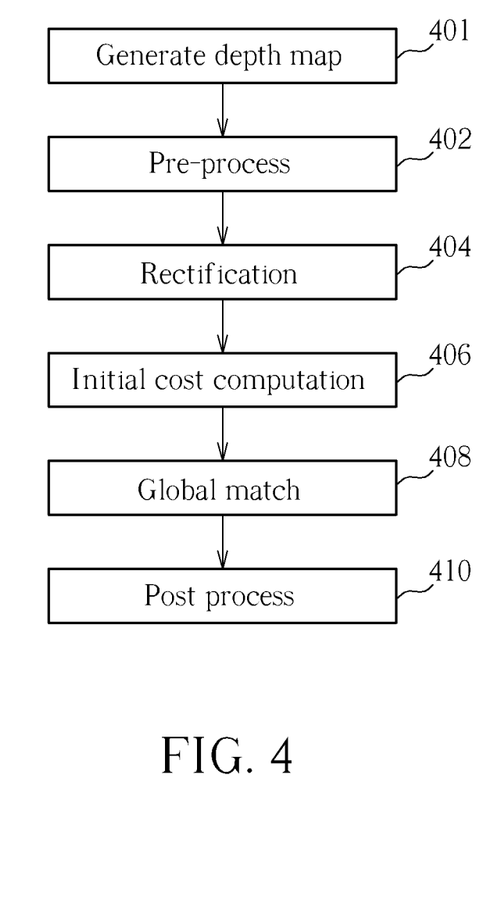
FIG. 4 illustrates a rough flowchart indicating a second part of the whole procedure disclosed in the present invention for generating a 3D image carrying depth information by processing 2D images fetched by a stereo image fetching device according to one embodiment of the present invention.

As shown in FIG. 4, the second part includes six procedures, i.e., a depth map generating procedure 401, a pre-processing procedure 402, a rectification procedure 404, an initial cost computation procedure 406, a global match procedure 408, and a post-processing procedure 410.

The depth map generating procedure 401 is utilized for generating a plurality of 2D images respectively fetched by the cameras disposed on the stereo image fetching device 100 into a plurality of depth maps carrying rough information of depths on the plurality of 2D images, where the generated depth maps in the Step 401 may acquire low resolution at this time.

The pre-processing procedure 402 may includes image re-sampling, color space converting (RGB to gray images), and memory allocation within the stereo image fetching device 100, and is utilized for transforming the plurality of 2D images carrying respective depth maps into a plurality of pre-processed images, where the pre-processing procedure may be replaced by any known image pre-processing algorithms so that it will not be further described for brevity.

The rectification procedure 404 is configured to reduce effects of epi-polar lines caused by linear movements of the object 120, and is known for people who skilled in related art so that it will not be described further. After processing the plurality of pre-processed images, a plurality of rectified images is generated.

The initial cost calculation procedure 406 is utilized for retrieving a first plurality of disparities between the plurality of rectified images, in a form of a DSI space which indicates a space defined by the displacement Dis between two cameras when fetching two 2D images corresponding to two rectified images, a moving distance of the object 120 between both the rectified images, and a Hamming distance between both the rectified images.

Figure 5:
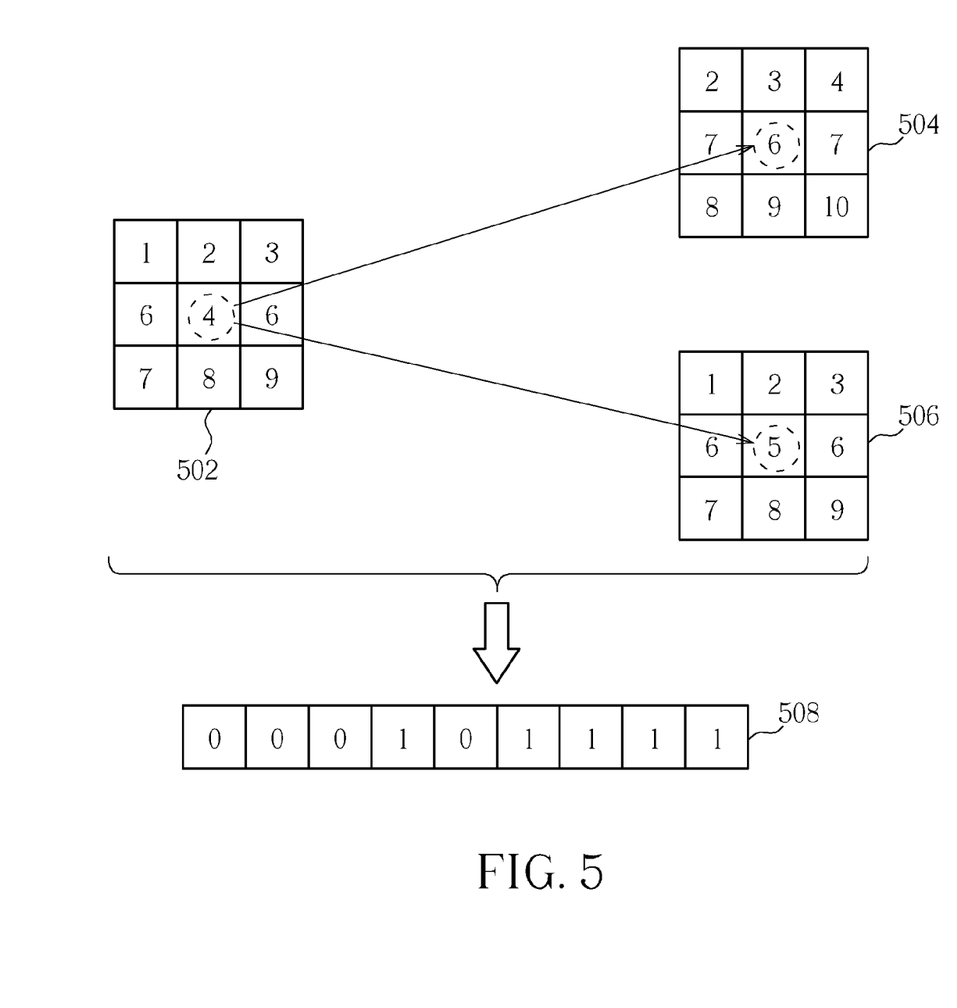
FIGS. 5-6 illustrate how to determine a hamming distance between two rectified images in an initial cost calculation procedure according to one embodiment of the present invention.
Figure 6:
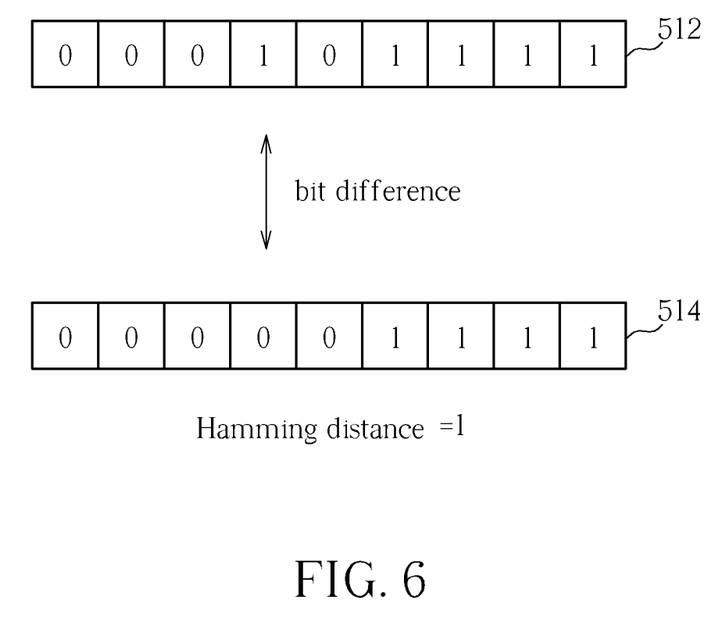

Please refer to FIGS. 5-6, which illustrate how to determine the hamming distance between two rectified images in the initial cost calculation procedure 408. Assume a rectified image has nine pixels, such as the images 502, 504, and 506 shown in FIG. 5. A comparison array 508 will be determined first by taking a depth value at the center of the rectified image, i.e. a center depth value, as a reference; when a surrounding pixel having a depth value higher than the center depth value, the surrounding pixel will be transformed into a bit 1 in the comparison array 508, else, when a surrounding pixel having a depth value lower than or equal to the center depth value, the surrounding pixel will be transformed into a bit 0 in the comparison array 508. Therefore, as can be observed in FIG. 5, all the rectified image 502, 504, and 506 will has same combination of bits in the comparison array 508.

The Hamming distance between two rectified images can be retrieved by comparing respective comparison arrays. As can be seen in FIG. 6, there are two comparison arrays 512 and 514, where there is only 1 bit of difference between the comparison arrays 512 and 514 so that the Hamming distance between two rectified images indicated by the comparison arrays 512 and 514 is 1.

Figure 7:
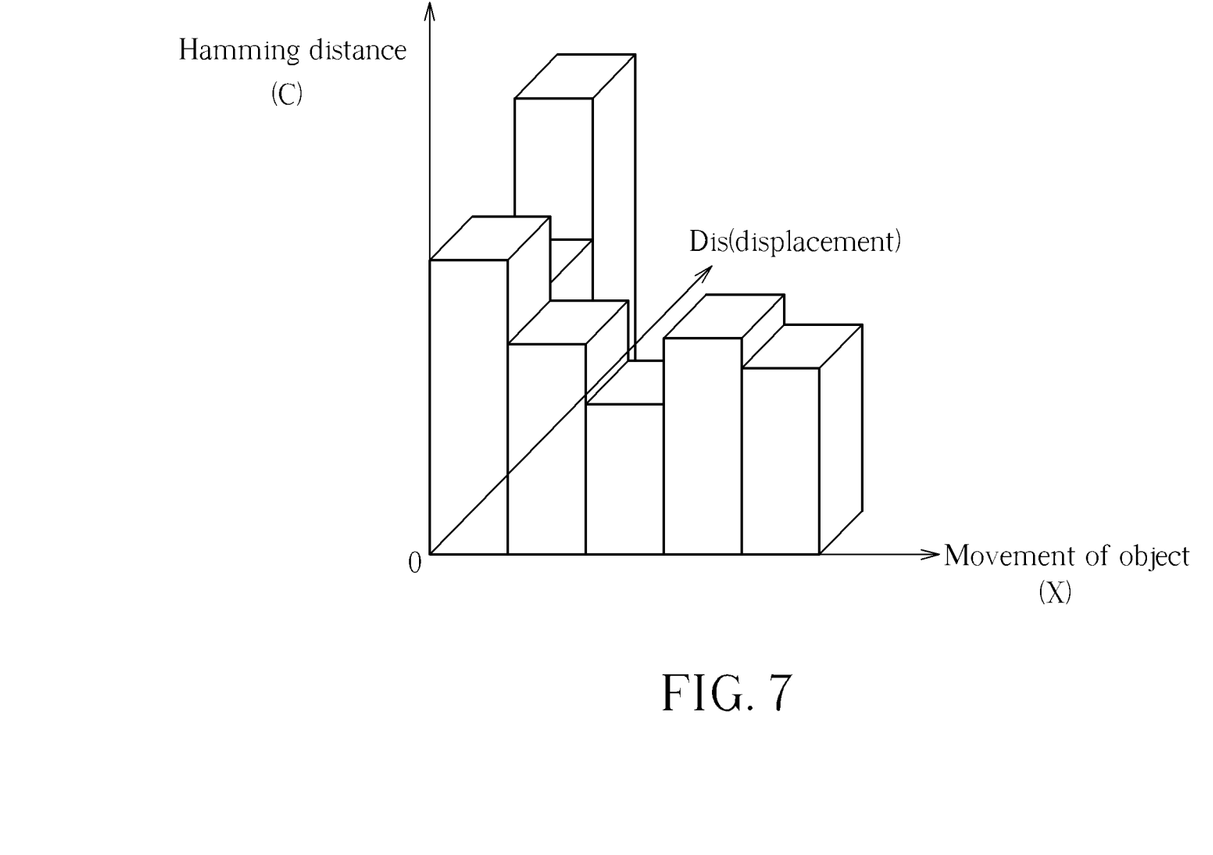
FIG. 7 illustrates an exemplary DSI space according to one embodiment of the present invention.

The Hamming distance between two rectified images indicates a cost of transiting one rectified image into another. Besides, since the displacement Dis between two cameras when fetching two 2D images corresponding to two rectified images and a moving distance of the object 120 between both the rectified images will be carried along with the rectified images, the DSI space can be easily formed herein, as exemplarily illustrated in FIG. 7. In the DSI space, rectified images having Hamming distance equal to or larger than 1 will be classified, and a smaller Hamming distance indicates better capabilities of being immune from noises and blurs in the rectified images filming the moving object 120.

After retrieving the DSI space, the global matching procedure 408 will be performed for reducing the cost of transiting images as much as possible, so as to introduce smoothness between small blocks of images.

The global matching procedure 408 will be introduced as follows. The global matching procedure 408 is to find a disparity map D that minimizes a disparity energy E (D), where the disparity energy E (D) is defined as follows:

$$E(D) = E_{data}(D) + E_{smooth}(D) \quad (1)$$

$E_{data}$ (D) means plain data disparity for indicating image consistency between images, and $E_{smooth}$ (D) means smoothness of images. Note that the disparity for a rectified image can be calculated according to the displacement D, a movement of the object 120, and the included angle between the object 120 and corresponding cameras so that an initial value of the disparity energy E(D) can be determined.

The equation (1) can be further rewritten as:

$$E(D) = \sum_p (C(p, Dp)) + \sum_{q \in Np} P1 * T[|Dp - Dq| = 1] + \sum_{q \in Np} P2 * T[|Dp - Dq| > 1] \quad (2)$$

The term $\Sigma_p(C(p,Dp))$ indicates the sum of all pixel matching (i.e. transiting) costs for the disparities of the disparity map D.

The term $$\sum_p \sum_{q \in Np} P1 * T[|Dp - Dq| = 1]$$

indicates a constant penalty P1 for all pixels q in a neighborhood Np of the pixel p, i.e. for images having the Hamming distance equal to 1 and determined while generating the DSI space.

The term $$\sum_{q \in Np} P2 * T[|Dp - Dq| > 1]$$

indicates a constant penalty P2 for all larger disparities changes, i.e. for images having the Hamming distance larger than 1 and determined while generating the DSI space, where the value of the constant penalty P2 is always larger than the constant penalty P1, therefore, effects from images having larger Hamming distances will be reduced when minimizing the disparity energy E(D).

The minimum of the disparity energy E(D) can be determined by using a dynamic programming algorithm of taking each pixel on a rectified image as an origin. Since the dynamic programming algorithm is known for people skilled in the art, details of performing dynamic programming will not be further described.

In one embodiment of the present invention, a matching cost aggregation technique is utilized for minimizing the disparity energy E(D), by tracing all 1D directions of each pixel p equally. Please refer to FIGS. 8 and 9, which illustrate how to minimize the disparity energy E(D) by tracing all 1D minimum matching costs for each pixel p on a rectified image.

Figure 8:
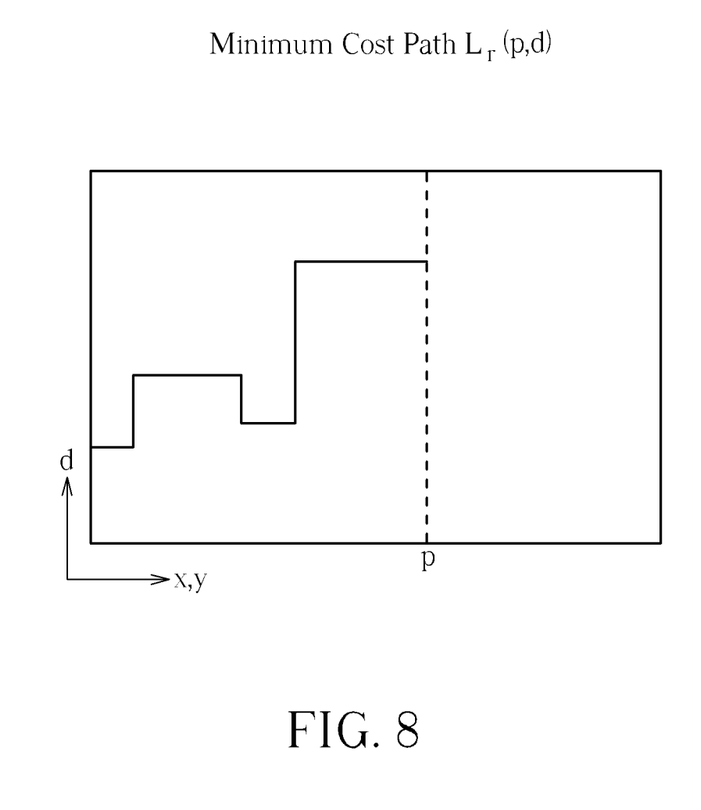
FIGS. 8 and 9 illustrate how to minimize disparity energy by tracing all 1D minimum matching costs for each pixel on a rectified image.
Figure 9:
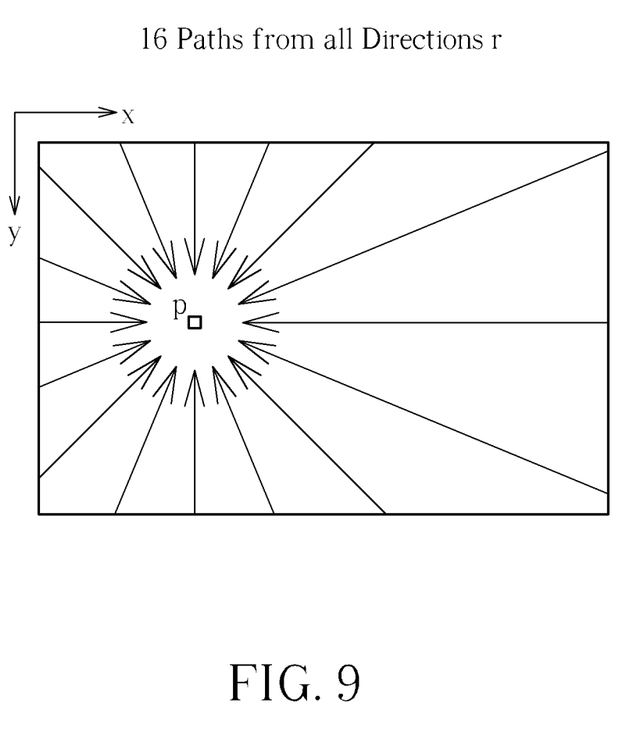

A smoothed cost S(p,d) is defined for a pixel p and a disparity d by summing the cost of all 1D minimum cost paths that end in the pixel p at the disparity d. A path $L_r'$ is defined to be a path that is traversed in a direction r, and a matching cost of the path $L_r'$ is recursively defined as:

$$L_r'(p,d) = C(p.d) + \min(L_r'(p-r,d), L_r'(p-r,d-1) + P1, L_r'(p-r,d+1) + P1, \min_i L_r'(p-r,i) + P2) \quad (3)$$

Note that $L_r'(p,d)$ is shown in FIG. 8. C(p.d) indicates a pixelwise matching cost. The remainder of the equation (3) adds the lowest cost of the previous pixel p−r of the path, including the appropriate penalty for discontinuities.

The actual matching cost for the path $L_r'$, i.e. $L_r$, can be inducted by subtracting the minimum cost of the previous pixel from the equation (3) as follows:

$$L_r(p,d) = C(p.d) + \min(L_r'(p-r,d), L_r'(p-r,d-1) + P1, L_r'(p-r,d+1) + P1, \min_i L_r'(p-r,i) + P2 - \min_k L_r'(p-r,k)) \quad (4)$$

By summing the matching cost $L_r$ in all directions r, the smoothed cost S(p,d) having a most ideal disparity d can be inducted as:

$$S(p, d) = \sum_r L_r(p, d) \quad (5)$$

The number of paths for the minimum matching cost path can be ranged from eight to sixteen. The smoothed cost S(p,d) indicates a minimum of the smoothness $E_{smooth}$ (D). Therefore, a minimum of the disparity energy E (D) may also be retrieved along with the most ideal d.

After determining the minimum of the disparity energy E(D), the post-processing procedure 410 is perform for generating a 3D image, i.e. the final 3D image. Note that the post-processing procedure may be implemented with any known image post-processing procedures for people who skilled in the related art.

Figure 10:
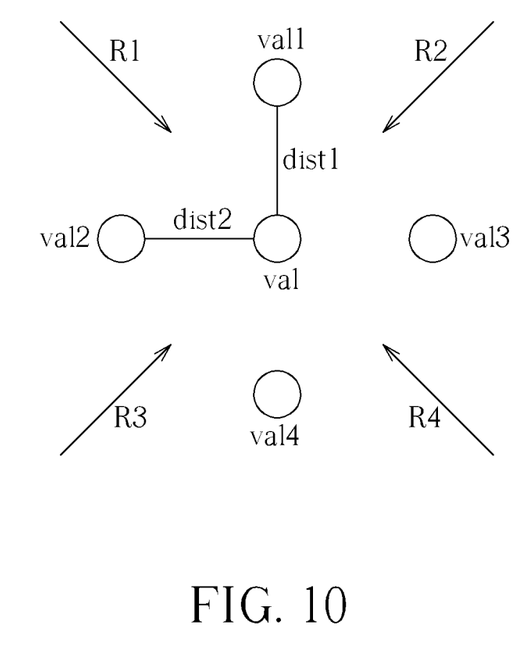
FIG. 10 illustrates a post-processing procedure according to one embodiment of the present invention.

Please refer to FIG. 10, which illustrates a post-processing procedure according to one embodiment of the present invention. As shown in FIG. 10, a center pixel has a pixel value val, and its neighboring pixels have pixel values val1, val2, val3, and val4 respectively. There are two distances Dist1 and Dist2 between the center pixel and two of its neighboring pixels as well. The pixel value of the center pixel may be updated to be an outcome pixel value Out according to the following equation:

$$Out = \frac{Dist2 \cdot Val1 + Dist1 \cdot Val2 + \frac{Dist2 \cdot Dist1}{4} \cdot Val}{\frac{Dist1 \cdot Dist2}{4} + Dist1 + Dist2} \quad (6)$$

By using the equation (6), pixels having a same color will have similar disparities as well, i.e. for smoothening disparity of neighboring pixels.

Figure 11:
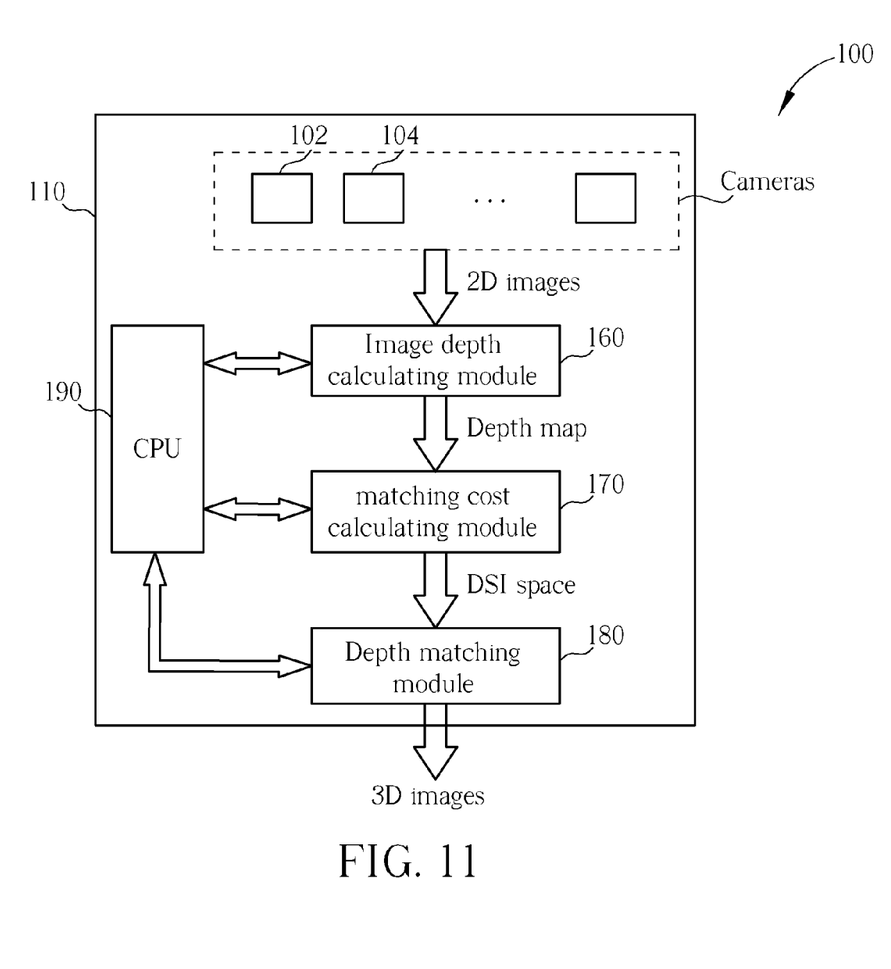
FIG. 11 illustrates a function block of the stereo image fetching device shown in FIG. 1.

Please refer to FIG. 11, which illustrates a function block of the stereo image fetching device 100 shown in FIG. 1. The stereo image fetching device 100 includes a housing 110, a plurality of cameras 102, 104, . . . , an image depth calculating module 160 for determining depth maps of 2D images, i.e. for performing the Step 401, a matching cost calculating module 170 for performing the Step 406, a depth matching module 180 for performing the Step 408. A CPU 190 is further utilized for performing the Step 402, the Step 404, and the Step 410.

Since the disparity energy E (D) is minimized, noises and blurs will be reduced significantly, and smoothness between neighboring images may also be introduced. Moreover, consistency between images filming the moving object 120 is thus gained without flickers. However, the above-listed advantages must be achieved by using the cameras as disposed in FIGS. 1-3 because of a wider range of vision retrieved in the original 2D images fetched by the cameras.

Most important of all, with the above-mentioned procedures and the stereo image fetching device 100, the cost of using depth camera for retrieving a 3D image can be significantly decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image depth recovering method using a stereo image fetching device, the method comprising:
   generating a plurality of 2D images respectively fetched by cameras disposed on the stereo image fetching device into a plurality of depth maps carrying information of depths on the plurality of 2D images;
   transforming the plurality of 2D images carrying respective depth maps into a plurality of pre-processed images;
   generating a plurality of rectified images by applying a rectification procedure to the plurality of pre-processed images to reduce effects of epi-polar lines caused by linear movements of an object in the plurality of 2D images;
   retrieving a first plurality of disparities between the plurality of rectified images, in a form of a DSI space which indicates a space defined by the displacement between two cameras when fetching two 2D images corresponding to two rectified images, a moving distance of the object between both the rectified images, and a Hamming distance between the two rectified images;
   calculating a disparity map that minimizes plain data disparity for indicating image consistency between images, and smoothness of images; and
   utilizing the disparity map to recover the image depth.

2. The method of claim 1 wherein transforming the plurality of 2D images carrying respective depth maps into the plurality of pre-processed images includes image re-sampling, color space converting, and memory allocation within the stereo image fetching device.

3. The method of claim 1 further comprising calculating the Hamming distance between the two rectified images as a number of bits that are different between a first comparison array representing a first of the two rectified images and a second comparison array representing a second of the two rectified images.

4. The method of claim 3 further comprising forming the first comparison array by taking a center depth value at a center of the first of the two rectified images as a reference, when a first pixel surrounding the center has a depth value higher than the center depth value, the first pixel surrounding the center is indicated as a bit 1 in the first comparison array, and when a second pixel surrounding the center has a depth value lower than or equal to the center depth value, the second pixel surrounding the center is indicated as a bit 0 in the first comparison array.

5. The method of claim 1 further comprising calculating the disparity map that minimizes a disparity energy E(D), where the disparity energy E(D) is defined as follows:

$$E(D) = E_{data}(D) + E_{smooth}(D)$$

where $E_{data}(D)$ means plain data disparity for indicating image consistency between images, and $E_{smooth}(D)$ means smoothness of images.

6. The method of claim 5 further comprising calculating disparity for a rectified image according to displacement, a movement of the object, and an included angle between the object and corresponding cameras so that an initial value of the disparity energy E(D) can be determined.

7. The method of claim 6 further comprising adjusting the included angle between the object and corresponding cameras to adjust image resolution.

8. The method of claim 1 further comprising calculating the disparity map that minimizes a disparity energy E(D), where the disparity energy E(D) is defined as follows:

$$E(D) = \sum_p (C(p, Dp)) + \sum_{q \in Np} P1 * T[|Dp - Dq| = 1] + \sum_{q \in Np} P2 * T[|Dp - Dq| > 1]$$

where the term $\Sigma_p(C(p,Dp))$ indicates a sum of all pixel matching costs for the disparities of the disparity map D, the term $$\sum_p \sum_{q \in Np} P1 * T[|Dp - Dq| = 1]$$

indicates a constant penalty P1 for all pixels q in a neighborhood Np of the pixel p for images having the Hamming distance equal to 1 and determined while generating the DSI space, and the term $$\sum_{q \in Np} P2 * T[|Dp - Dq| > 1]$$

indicates a constant penalty P2 for all larger disparities changes for images having the Hamming distance larger than 1 and determined while generating the DSI space, where the value of the constant penalty P2 is always larger than the constant penalty P1.

9. The method of claim 1 further comprising calculating a smoothed cost S(p, d) for a pixel p and a disparity d by summing cost of all 1D minimum cost paths that end in the pixel p at the disparity d.

10. The method of claim 1 further comprising performing a post-processing procedure comprising updating a pixel value of the center pixel to be an outcome pixel value Out according to the following equation $$Out = \frac{Dist2 \cdot Val1 + Dist1 \cdot Val2 + \frac{Dist2 \cdot Dist1}{4} \cdot Val}{\frac{Dist1 \cdot Dist2}{4} + Dist1 + Dist2}$$

where Val indicates the pixel value of the center pixel, and Val1, Val2, Val3, and Val4 indicate pixel values of neighboring pixels respectively, Dist1 indicates a distance between the center pixel and a first of the neighboring pixels, and Dist2 indicates a distance between the center pixel and a second of the neighboring pixels.

* * * * *

UNITED STATES PATENT AND TRADEMARK OFFICE
CERTIFICATE OF CORRECTION

PATENT NO. : 9,661,310 B2  
APPLICATION NO. : 13/304704  
DATED : May 23, 2017  
INVENTOR(S) : Hui Deng and Jin Wang It is certified that error appears in the above-identified patent and that said Letters Patent is hereby corrected as shown below:

On the Title Page

Item (73), correct the name and the residence of the assignee from "ArcSoft Hanzhou Co., Ltd., Hanzhou, Zhejiang Province (CN)" to --ArcSoft Hangzhou Co., Ltd., Hangzhou, Zhejiang Province (CN)--.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*